Dec. 24, 1940.  A. M. CRISTIANO ET AL  2,226,398
MEANS FOR ASSEMBLING ELECTRIC MOTORS AND GENERATORS
Filed Feb. 15, 1937  3 Sheets-Sheet 2
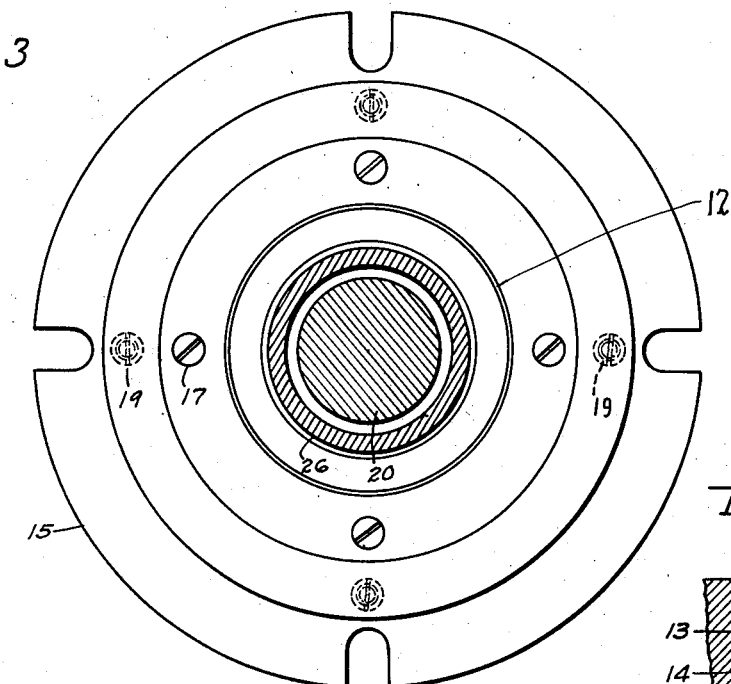
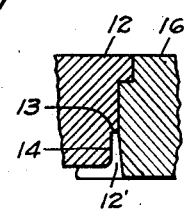
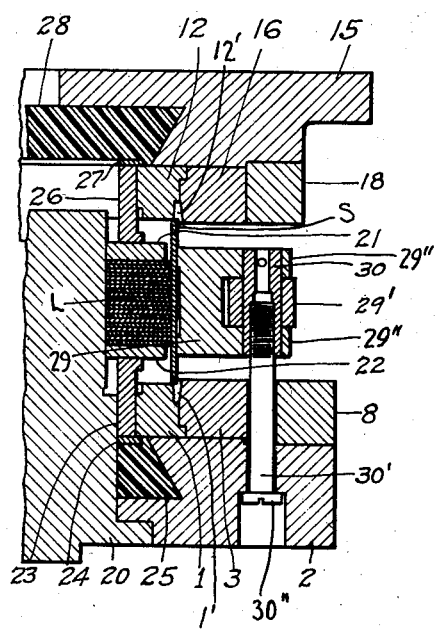
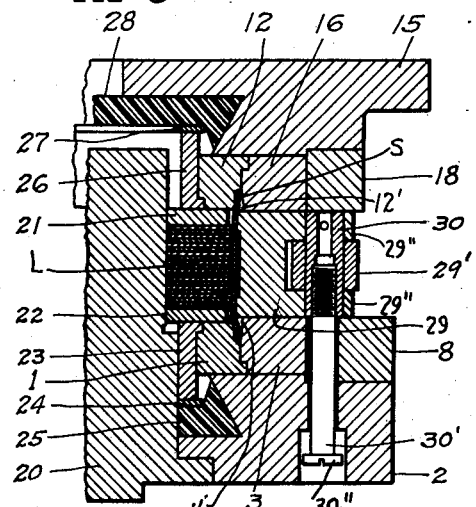
INVENTORS
Angelo M. Cristiano
Frank M. Reibold
BY
Sisley + Welch
ATTORNEYS

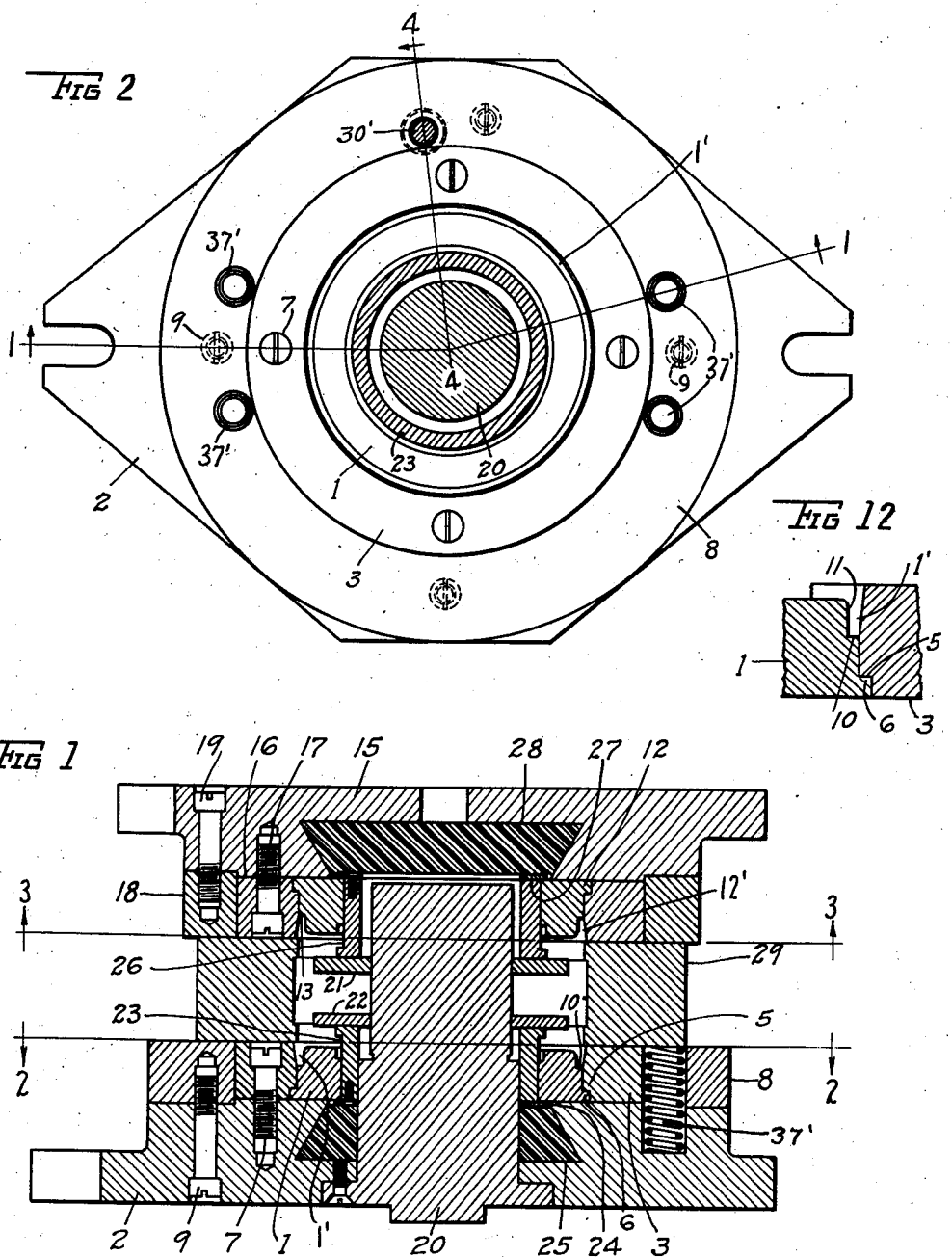

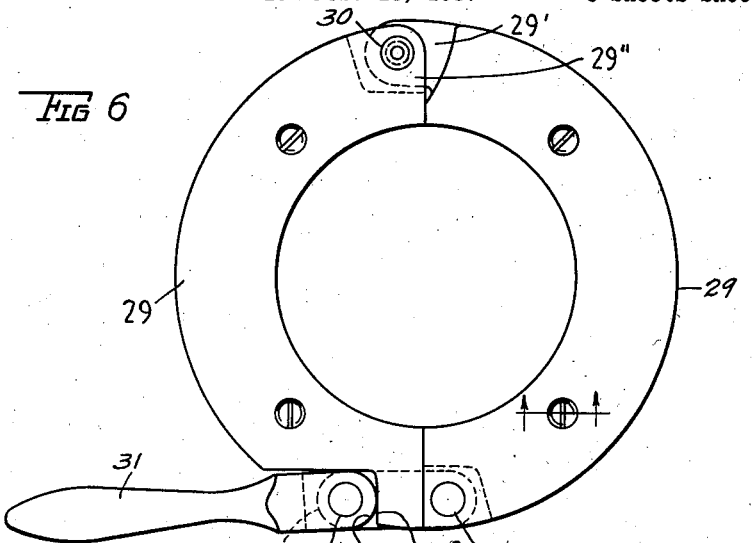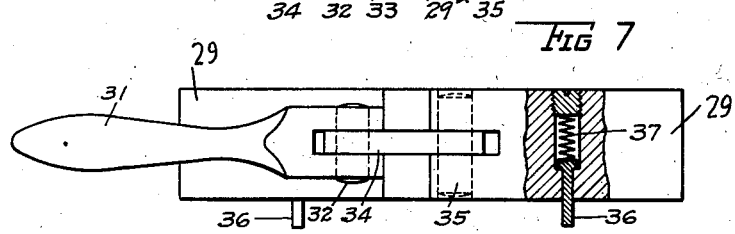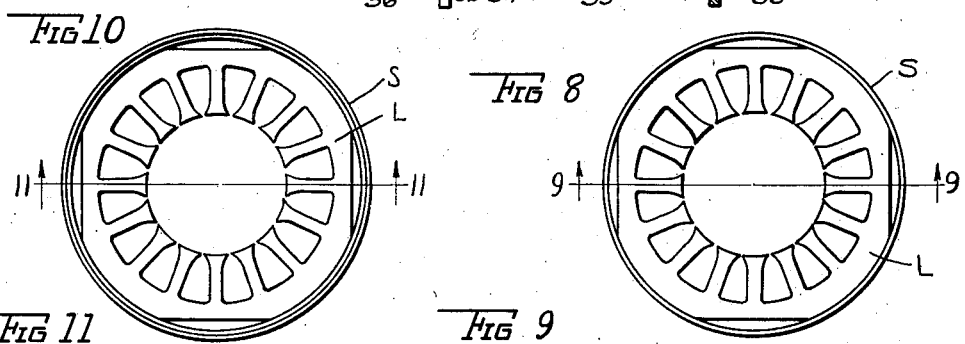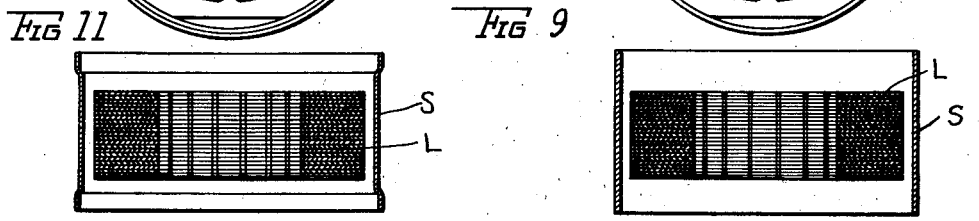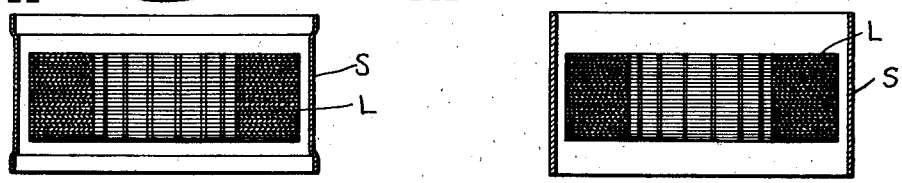

Patented Dec. 24, 1940

2,226,398

UNITED STATES PATENT OFFICE 2,226,398

MEANS FOR ASSEMBLING ELECTRIC MOTORS AND GENERATORS

Angelo M. Cristiano and Frank M. Reibold, Springfield, Ohio, assignors to Robbins & Myers, Inc., Springfield, Ohio, a corporation of Ohio Application February 15, 1937, Serial No. 125,778

3 Claims. (Cl. 153—48)

This invention relates to means for assembling electric motors and generators.

One of the objects of the invention is to provide a cheaper method and means for truing the ends of the shell which carries the stator so that the ends will be exactly parallel with each other and at right angles to the axis of the stator bore whereby when the accurately finished heads are fitted to the ends of the shell the shaft bearings carried by the heads will be in exact alignment.

Another object of the invention is to provide a method and means to maintain the accuracy of the bore of the stator laminations so as to secure a uniform air gap between the stator and rotor, by securing accurate concentricity of the interior wall of the stator shell with the rotor.

A more specific object of the invention is to provide a method and hydraulically operated means for paralleling the ends of the stator supporting shell of an electric motor or generator such as to cause them to register accurately with the machined mating heads or end bells for electric motors or generators.

In the accompanying drawings:

Fig. 1 is a vertical section of the apparatus, the section being on the line 1—1 of Fig. 2.

Fig. 2 is a section on the line 2—2 of Fig. 1.

Fig. 3 is a section on the line 3—3 of Fig. 1.

Fig. 4 is an enlarged vertical sectional view of some of the parts shown in Fig. 1 on the line 4—4 of Fig. 2, but showing in section a part of the shell and stator laminations in position just before the forming operation has taken place.

Fig. 5 is an enlarged vertical section of some of the parts shown in Fig. 1 also on the line 4—4 of Fig. 2 also showing a portion of the shell and stator laminations, after the forming operation has been completed.

Fig. 6 is a plan view of the clamp for the stator and its shell.

Fig. 7 is a view partly in side elevation of the clamp partly in vertical section on the line 7—7 of Fig. 6.

Fig. 8 is a view of one end of the stator and its shell before the forming operation has taken place.

Fig. 9 is an axial section of the stator and its shell, on the line 9—9 of Fig. 8, before the forming operation has taken place.

Fig. 10 is an end view of the stator and its shell after the forming operation has taken place.

Fig. 11 is an axial section of the stator and its shell, on the line 11—11 of Fig. 10, after the forming operation has taken place.

Fig. 12 is an enlarged vertical section of a portion of the lower die, and its support.

Fig. 13 is an enlarged vertical section of a portion of the upper die and its support.

The apparatus for carrying out the improved method comprises a pair of mating dies which are mounted upon a hydraulic press. The lower die is indicated at 1 and is secured to a lower mounting plate 2 which in turn is secured to the lower table (not shown) of a hydraulic press. The manner of securing this lower die 1 to the lower mounting plate 2 is by providing a ring 3 which has a shoulder 5 which engages a shoulder 6 on the lower part of the die; this ring being secured to the mounting plate by screws 7. A second ring 8 surrounds the ring 3 and is secured to the mounting plate 2 by screws 9, the second ring serving to stiffen and support the first ring; the die support being formed with the two rings more particularly for convenience in assembly.

The upper portion of this lower die is formed at its outer edge with an annular recess 1' to form an accurately machined horizontal annular seat 10 and a vertically disposed accurately machined annular vertical wall 11 as shown in the enlarged detail (Fig. 12).

The upper die is indicated at 12 and it also has in the outer edge of its lower portion an annular recess 12' to form an accurately machined horizontal annular seat 13 and an accurately machined vertical annular wall 14, as shown in the enlarged detail view (Fig. 13). Both the upper and lower dies are so assembled that these recesses will be in exact registry with each other. The upper die is secured to an upper mounting plate 15 which in turn will be secured to the upper movable table (not shown) of the hydraulic press. As in the case of the lower die, the upper die is secured to the upper mating table by a ring 16 which is fastened to the upper mounting plate by screws 17, and this ring is supported and stiffened by a second ring 18 which is secured to the upper mounting plate by the screws 19; the upper die support being formed with two rings to facilitate assembly.

Connected with the lower mounting plate 2 by screws 20' is a cylindrical stud 20 which acts as a pilot to receive the motor or generator shell and its stator when the dies are separated.

Surrounding the pilot 20 are two annular compressor plates 21 and 22. The lower compressor plate 22 is carried by a collar 23 having a foot 24 (Figs. 4 and 5) which contacts with an annular resilient member 25, preferably of resilient soft vulcanized rubber. This resilient member serves normally to hold the plate 22 above the lower die 1. The upper plate 21 is also carried by a collar 26 having a foot ring 27 which is in contact with an annular resilient member 28, the latter serving to yieldingly hold the plate 21 below the upper die with the ring 27 in engagement with the upper surface of the die 12, as shown in Fig. 1.

When the shell and its stator are inserted on the pilot, the lower end of the stator laminations L rests upon the lower plate 22, and when the upper die is lowered the upper compressor plate 21 rests upon the upper end of the stator laminations, as shown in Fig. 4. These plates 21 and 22 during the initial operation firmly lock the stator and the shell previous to the forming operation.

Before the forming operation and after the shell S and the stator laminations L have been placed on the pilot 20, a clamping ring is secured about a substantial intermediate portion of the shell. This clamping ring is in two parts 29 (Figs. 6 and 7), pivoted together by a pin 30, one of the clamping ring members having a tongue 29' and the other bifurcated portions 29" to receive the tongue 29' (Figs. 4 and 5). The clamping ring is firmly clamped to the shell by a cam lever 31 pivoted on a stud 32 in one end of a link 34, the link being pivoted on a stud 35 on one member of the clamping ring. The lever has cam surfaces 33 which engage shoulders 29ᵃ on the other member of the clamping ring. The pivot pin 30 is a hollow pin and is internally threaded at its lower end to receive a screw 30' which is passed upwardly through openings in the lower mounting plate 2 and ring 8. The screw has a head 30" at its lower end slidably located in a counterbore in the mounting plate 2, and a series of springs 37 arranged in recesses in the clamping ring 29 act through the plungers 36 to lift the clamping ring when the upper die is raised, these springs having been put under compression by plungers 36 when the clamping ring is in its lower position shown in Fig. 5. The extent of the upward movement of the clamping ring is limited by contact of the head 30" with the upper end of the counterbore in the lower mounting plate 2. This is for the purpose of eliminating handling of the clamping ring other than opening and closing it. Preferably a series of additional springs 37', located in the lower mounting plate 2 and ring 8 are employed to assist in the raising movement of the clamping ring. The clamping ring also acts as a stop to accurately space the seats 10 and 13 by contact with the lower rings 3 and 8 and the upper rings 16 and 18.

After the stator and its shell have been placed over the pilot with the bottom face of the stator laminations in contact with the lower plate 22, which is then above the die by reason of the resiliency of the resilient member 25, and with the clamping ring applied thereto, as shown in Fig. 4, the upper die is lowered to initially bring the upper plate 21 in contact with the upper end of the stator laminations to initially apply pressure to the stator so as to hold the stator and its shell rigid. Further movement of the upper die forces the ends of the stator shell into the upper and lower forming dies with the result that the ends of the stator shell contact with the horizontal seats 10 and 13 of the forming dies and press the edges of the shell sufficiently to bring them into exact parallel relation with each other. This operation also causes the vertical faces 11 and 14 of the forming dies to engage the inner periphery of the ends of the stator shell and expand them into accurate concentricity with the desired bore of the stator laminations so as to bring said stator laminations in correct concentricity with the outer surface of the rotor, after the parts of the motor or generator have been assembled, to provide a proper air gap. In this operation the clamping ring 29 moves in unison with the stator and its shell and acts as an outer support for the stator in the forming and paralleling operation. In the downward movement of the clamping ring the plungers 36 contact with the ring 8 thereby compressing the coil springs 37 so as to not only cushion the downward movement of the parts but also to act to restore them to normal position when the upper die is raised. In connection with these spring-pressed plungers the lower plate 22 by reason of the resilient member 25 also acts to eject the stator and its shell after the forming operation has been completed.

Having thus described our invention, we claim:

1. In apparatus for truing the shell of a stator, for an electric motor or generator, having laminations assembled in the shell and provided with aligned circular apertures which form a cylindrical bore adapted to receive the rotor element of the motor or generator, said bore being concentric to the axis of rotation of the rotor element when the latter is assembled with the stator, the combination of a pair of relatively movable dies each having an annular groove to receive an end of said shell, said grooves operating simultaneously on the inner and outer surfaces of the opposite ends of said shell to slightly expand said ends and bring them accurately into concentricity with said axis and also slightly work the edges of said ends to bring them into accurate parallelism in planes normal to said axis, and a pair of yieldably supported annular plates to engage the ends of said stator laminations before and during the operation of said dies on the ends of said shell.

2. In apparatus for truing the ends of an assembled shell and laminations of the stator, of an electric motor or generator, wherein the laminations have a bore adapted to receive the rotor element of the motor or generator, the combination of a pilot on which said bore fits, a pair of relatively movable dies each of which has an annular groove concentric with said pilot, said grooves having side walls spaced apart a distance substantially equal to the thickness of said shell and adapted to expand the ends of the shell and bring them into concentricity with said bore, the bottoms of said grooves being parallel and adapted to simultaneously engage the edges at the ends of the shell and press them into parallelism in planes normal to the axis of the shell while the side walls of said grooves maintain the portions of said ends adjacent said edges substantially parallel with the body of the shell.

3. In apparatus for truing the ends of an assembled shell and laminations of the stator, of an electric motor or generator, wherein the laminations have a bore adapted to receive the rotor element of the motor or generator, the combination of a pilot on which said bore fits, a clamping ring for clamping the intermediate portion of the exterior of said shell with the end portions of the shell free from said ring, a pair of relatively movable dies each of which has an annular groove concentric with said pilot, said grooves having side walls spaced apart a distance substantially equal to the thickness of said shell and adapted to expand the ends of the shell and bring them into concentricity with said bore, the bottoms of said grooves being parallel and adapted to simultaneously engage the end surfaces of the shell and press them into parallelism while the side walls of said grooves maintain the portions of said ends adjacent said surfaces substantially parallel with the body of the shell.

ANGELO M. CRISTIANO.
FRANK M. REIBOLD.